Figure 1:
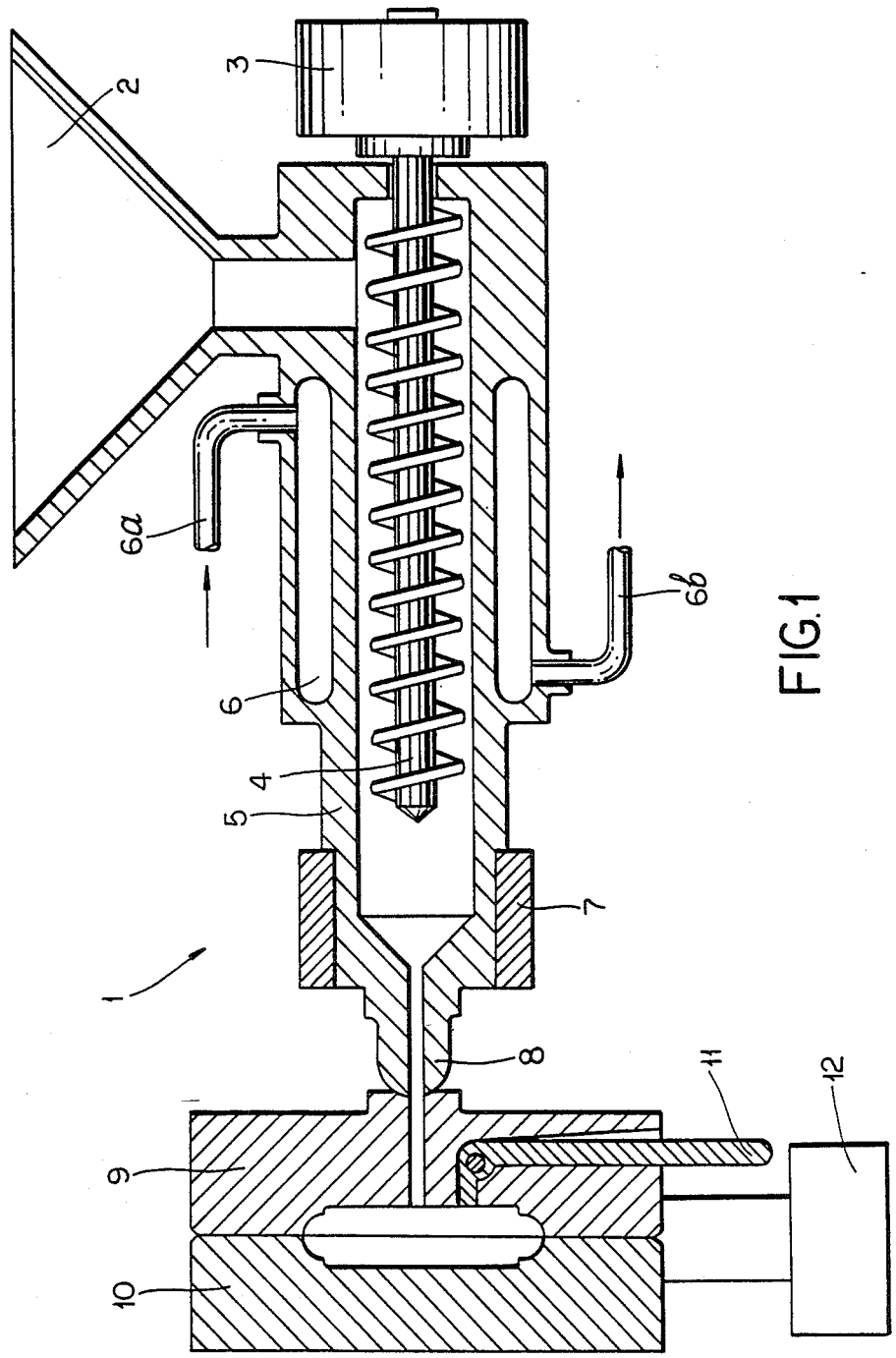

United States Patent [19]

Forrest et al.

[11] Patent Number: 4,886,440
[45] Date of Patent: Dec. 12, 1989

[54] APPARATUS FOR PRODUCING A RESTRUCTURED FOOD PRODUCT

[76] Inventors: Alexander Forrest, 29 Bassett Dr., Bathurst 2798; Anthony J. Gordon, "Godolphin", East Guyong, Via Millthorpe, 2798 both of Australia

[21] Appl. No.: 901,289
[22] Filed: Aug. 27, 1986
[30] Foreign Application Priority Data Aug. 28, 1985 [AU] Australia ............... PH2182

[51] Int. Cl.⁴ .......................................... B29C 47/36
[52] U.S. Cl. ................. 425/208; 425/378.1; 425/548
[58] Field of Search ............ 425/208, 378 R, 547–550, 425/542; 264/327

[56] References Cited

U.S. PATENT DOCUMENTS

| | | | |
|---|---|---|---|
| 3,534,128 | 10/1970 | Makowski | 264/327 X |
| 3,867,496 | 2/1975 | Mlavsky et al. | 264/327 X |
| 3,934,743 | 1/1976 | McChesney et al. | 264/327 X |
| 3,991,153 | 11/1976 | Klausner et al. | 425/208 X |
| 4,039,691 | 8/1977 | Hildebolt | 426/511 |
| 4,074,362 | 2/1978 | Kruder et al. | 425/208 X |
| 4,145,176 | 3/1979 | Nelson | 425/547 X |
| 4,533,310 | 5/1985 | Spinner | 425/208 X |

FOREIGN PATENT DOCUMENTS

| | | | |
|---|---|---|---|
| 0835801 | 6/1981 | U.S.S.R. | 425/328 R |
| 577373 | 5/1946 | United Kingdom . | |
| 813208 | 5/1959 | United Kingdom . | |
| 1365941 | 9/1974 | United Kingdom . | |
| 2004804 | 4/1979 | United Kingdom . | |

Primary Examiner—Charles Hart
Attorney, Agent, or Firm—Ladas & Parry

[57] ABSTRACT

A moulding apparatus and a method for producing a food product from a food mixture/formulation having a heat sensitive binding agent are described. The apparatus has a component which includes a barrel with a nozzle on one end. A heater is associated with the nozzle to heat a food mixture/formulation which is to be fed under pressure therein to a preselected upper temperature and thus form a food paste. A differentially heated mould is associated with the nozzle to receive the food paste to be ejected therefrom and then to form a moulded food product from the food paste.

8 Claims, 2 Drawing Sheets

APPARATUS FOR PRODUCING A RESTRUCTURED FOOD PRODUCT

This invention relates to a moulding apparatus for producing a food product from a food mixture/formulation, a component and a mould therefor, a process for producing a moulded food product from a food mixture/formulation and a moulded food product produced by this process.

The expression "food mixture/formulation" as used throughout the specification and claims means a food powder which has been premixed with water or with water and at least one other liquid. The one other liquid can be oil such as a vegetable or animal based oil and/or a liquid food colouring and/or a plasticiser such as for example glycerol. Preferably the food mixture contains less than 30% and more preferably less than 25% by weight of water. The food mixture/formulation intrinsically has or has as an additive a heat sensitive binding agent.

The application of extrusion production techniques are well known to the food industries, particularly in connection with the production of pasta and dry pet food products. The pellet or biscuit normally produced is formed by extruding a mixture under pressure through a die of the desired shape in a continuous process and then cutting through the product as it emerges from the other side of the die. The perceived shape of the pellet or biscuit is apparent only in cross section or in effect, only in two dimensions. Alterations in the frequency of extrudate cutting upon emergence from the die allows varying lengths of the food product to be obtained.

The ingredients for the restructured food product are usually fed, as a mixed food paste, to the die by a screw system with or without added water or steam, which allows for a build up of pressure and heat to thereby cook and gelatinize any starches present in the paste. This extruding process is known as high pressure-low temperature extrusion and as the paste is only subjected to high temperature and pressure for a few seconds there is little nutritional damage to the product.

An alternative food production process well known in the food industries to obtain an appropriately shaped product is to use a template to cut the desired biscuit or pellet shape from a dough which is then cooked as it passes down a conveyor system through a heating process.

When food is manufactured according to the aforesaid processes and packaged in the form of small pellets, that is to say approximately 1 cm cubed shapes or smaller, the bulk density of the final packaged product as a whole, as opposed to the density of the individual pellets, is typically less than 1 g/cc. This makes the handling and transportation of such product inefficient. Moreover, such products tend to break up and form crumbs which makes the problems relating to the packaging, handling and transportation thereof greater. It is also noted that there is a wide variation in the bulk density for each particular paste ingredient between each of the pellets of the final product so that it is difficult to calculate the feeding quantity of pellets required to ensure that a predetermined nutritional level for each and every one of the ingredients is met. Hence, the desirable situation of readily providing a whole balanced meal in one pellet is not simply achievable.

In U.S. Pat. No. 4,303,008 by Hice and Webb, there is disclosed an apparatus for producing a restructured secondary food product for humans from meat or fish particles. The particles are first converted into a liquid paste with a high moisture content (typically more than 50%) and then injected under pressure into a heated mould wherein the paste is cooked prior to ejection of the protein based formed food product.

The apparatus disclosed in U.S. Pat. No. 4,303,008 is not suitable for use with starch based food pastes since the injection pressures used by Hice and Webb are relatively low, around 100-150 psi, as compared to around 15,000 psi in the presently described moulding apparatus. Further, the Hice and Webb apparatus allows conventional "high" pressure flexible hosing to be used to transport the food paste to the extruder. This hosing could not transport a food mixture/formulation containing less than 25-30% total moisture which requires much higher operating pressures. Such low moisture powders are much less flowable than the fluid pastes disclosed by Hice and Webb.

It is an object of this invention to provide a moulding apparatus for producing a food product from a food mixture/formulation of any moisture content but typically less than 30% which also contains a heat sensitive binding agent, an injection component and a mould for the apparatus.

Another object is to provide a process for producing a moulded food product from a food mixture/formulation containing a heat sensitive binding agent.

A further object is to provide a food product produced according to the process of the invention.

A further object is to provide a mould and a component for a moulding apparatus for producing a food product from a food mixture/formulation having a heat binding agent.

Thus in a first embodiment this invention provides a component for a moulding apparatus for producing a food product from a food mixture/formulation having a heat sensitive binding agent said component comprising a barrel having a nozzle on one end and a heater associated with said nozzle to heat a food mixture/formulation therein to a preselected upper temperature or upper temperature range wherein said binding agent in said mixture/formulation becomes at least partially activated.

Preferably the component also includes cooling means associated with the barrel to cool a food mixture/formulation therein except in the nozzle to a preselected lower temperature or lower temperature range whereby the heat sensitive binding agent in the mixture/formulation remains substantially unactivated. It is preferred that the cooling means is in the form of a water jacket surrounding the barrel. The water jacket has an inlet and an outlet via which water can be circulated through the jacket.

Conveniently the inner surface of the barrel is roughened and/or has at least one groove to ameliorate rotational slippage of the food mixture/formulation which is to be fed through said barrel, preferably by means of a screw worm inside the barrel.

In a second embodiment this invention provides a moulding apparatus for producing a food product from a food mixture/formulation having a heat sensitive binding agent said apparatus including the component as defined in the first embodiment a hopper associated with said barrel from which the food mixture/formulation can be fed into said barrel; pressure applying/feeding means associated with said barrel to feed the mixture/formulation therein into said nozzle under pressure to form a food paste; optionally fluid inlet means associated with said barrel; optionally mixing means within said barrel to mix the food mixture/formulation from said hopper and fluid from said fluid inlet means to form a food paste; and a mould associated with said nozzle to receive food paste to be ejected therefrom and to form a moulded food product from said paste.

In a third embodiment this invention provides a mould for the apparatus of the first and second embodiments, said mould comprising a first mould part; a second mould part engageable with said first mould part to thereby close said mould; a mould heater connected to said first and second mould parts to differentially supply heat thereto and to heat said second mould part to a temperature higher than said first mould part to assist in the release of said product from said mould after moulding. Preferably the first mould part and/or said second mould part has a strikeable projection on the and/or each exterior surface thereof to further assist in release of food product therefrom.

In a fourth embodiment this invention provides a process for producing a moulded food product from a food mixture/formulation having a heat sensitive binding agent using the apparatus of the second embodiment comprising the steps of: heating said nozzle to said preselected upper temperature or upper temperature range; differentially heating said mould to a preselected temperature for moulding said food product from food paste to be injected into said mould; supplying said mixture/formulation to said hopper; providing said mixture/formulation from said hopper into said barrel; feeding said provided mixture/formulation under pressure through said barrel into said heated nozzle to form a food paste; injecting said paste from said nozzle into said heated mould; ejecting a moulded food product from said mould after conversion of said paste to said product has occurred in said mould.

In a fifth embodiment this invention provides a moulded food product produced by the process of the fourth embodiment.

Preferably the preselected upper temperature or upper temperature range is about 100° C. or about 70° C. to 120° C. and more preferably about 105° C. or about 90° C. to 110° C.

Preferably the preselected lower temperature or lower temperature range is about 20° C. or about 5° C. to 60° C. more preferably about 22° C. or about 15° C. to 30° C.

It is particularly preferred that the heat sensitive binding agent is starch and this can be present in the form of an added cereal product.

Preferably, the food mixture/formulation passes from the hopper through the barrel to the nozzle by means of a screw piston system.

It is to be understood that the food mixture/formulation can be also be delivered to the barrel from the hopper as a powder or mixture and thereafter converted to a paste by mixing with a fluid within the barrel. This conversion induced by the application of heat and/or pressure can be readily achieved, for example by means of a screw piston system.

Conveniently the moulded food product has a density greater than approximately 1 g cm$^{-3}$.

The main difficulties overcome by the embodiments of the invention are the difficulty of feeding the food mixture/formulation through the barrel and the difficulty of releasing the moulded food product from the mould. Feeding the food mixture/formulation through the barrel is improved by grooving the inside and cooling the outside of the barrel. Injection to the mould is aided by heating the end of the barrel. Release from the mould is achieved by using a knock-out bar on either mould platen in conjunction with a sprue cutter to separate the contents of the injection sprue from the moulded product and by heating both mould platens, but preferably the one without the knock-out bar to a slightly higher temperature than the other.

The present invntion allows for the moulded food product to be produced into selected three dimensional shapes as opposed to the two dimensional shapes typically produced by earlier extrusion processes. Thus a product can be produced which has not only an attractive shape in three dimensions (e.g. a bone shape for dogs or fish shape for cats) but has a high Bulk Density as well as a high density for the individual components (with a specific gravity greater than 1.0, typically 1.3). This permits the compression of the total daily nutrient requirements for protein, (and essential amino acids) energy, minerals, essential fatty acids and vitamins into a small volume which is convenient to store and to feed. A small dog for example of around 5 kg liveweight would on average require about 125 grammes of food solids per day. This amount could be compressed by the processes of the invention herein described into one three dimensional bone shape occupying a volume of only 95 grammes. Alternatively the day's requirements could be provided in three separate "bone" meals each bone weighing 32 grammes. Provided care is taken to ensure the mixture which is compressed contains all the required nutrients in the correct amounts then no other food need be provided. Such a product would be particularly desirable for example, where animals are being transported and a minimum of packaging and mess and a maximum of convenience is required. Packaging and mess is reduced because the compressed product is quite cohesive and doesn't break up and form crumbs as easily as the conventionally pelleted foodstuffs. In addition to the above uses the product can be fed to the animal simply as a treat which is nutritionally beneficial (a vitamin or mineral enriched "bone" or "fish" could be made instead of a vitamin or mineral tablet).

Figure 2:
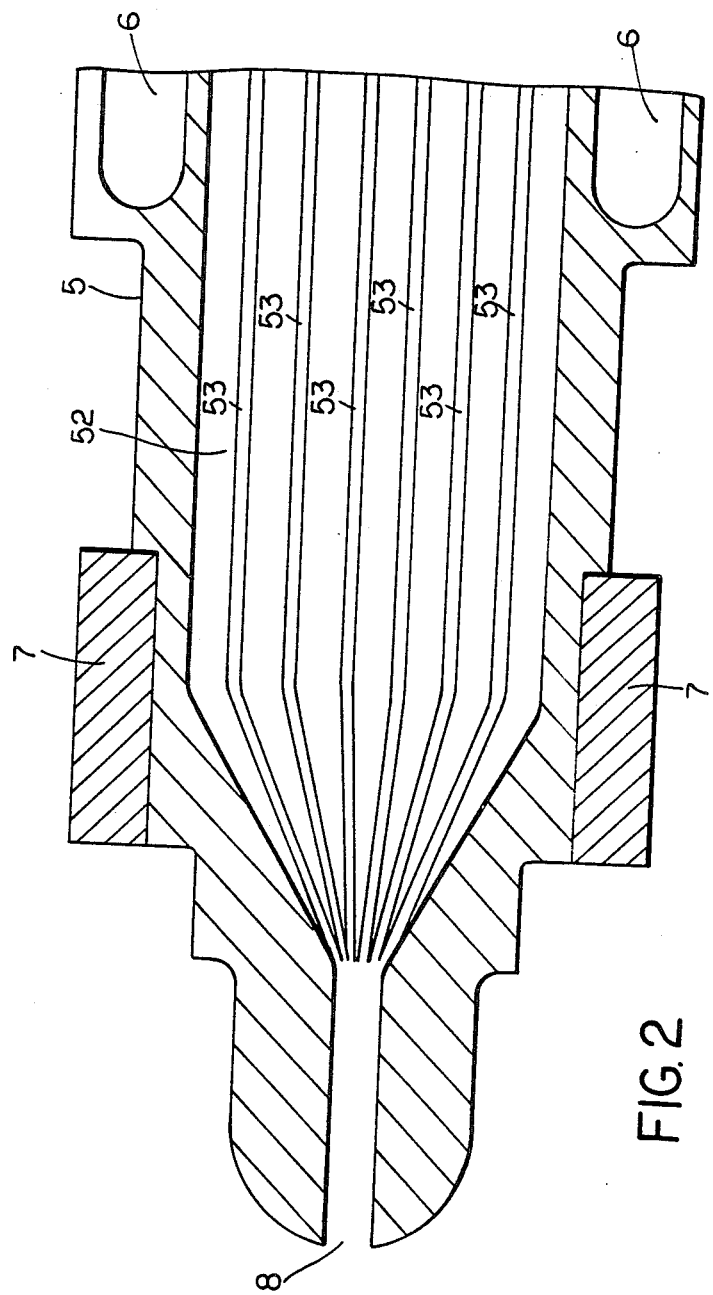

An embodiment of the present invention will now be described with reference to the drawings in which:

FIG. 1 is a schematic longitudinal cross-sectional view of the apparatus of one embodiment; and FIG. 2 is a longitudinal cross section of the injector portion of the apparatus of FIG. 1.

As seen in FIG. 1, one embodiment of the apparatus 1 comprises a storage hopper 2 from which a starch containing food mixture/formulation (not illustrated) is fed by means of a screw drive 3 and screw shaft 4 into an injector barrel 5 where the mixture/formulation is subjected to considerable mixing and compression to facilitate powder to paste conversion as barrel 5 fills with the mixture/formulation. Drive 3 rotates screw shaft 4 in the reverse direction during filling of barrel 5 with a predetermined amount of food mixture/formulation. A water jacket 6 having inlet 6a and outlet 6b is disposed about a portion of barrel 5 closest to hopper 2 in order to ensure that the mixture/formulation continues to feed and does not clog barrel 5 due to the premature commencement of gelatinization of the mixture/formulation. Further, heater 7 is located adjacent to and in thermal contact with nozzle 8 so that sufficient heat (around 90° to 110°) is provided to cause gelatinization of the starch present in the food mixture/formulation and hence conversion to a paste prior to the injection of the paste into engaged first and second mould parts 9 and 10 respectively by the forward movement of screw shaft 4. First and second mould parts 9, 10 are engageable with one another by means of a number of pins and corresponding sockets (not illustrated) and each is heated by a differential heating element 12 to a temperature around 100°-150°. However, one mould part 9 is differentially around 5° to 20° hotter than the other mould part 10 in order to facilitate the ejection of the cured and finished product (not illustrated) after mould parts 9, 10 are disengaged. The moulded product sticks to the coolest side which contains the knockout bar so that when the mould opens the product is readily released by the knock-out bar. It can be on either side of the mould. To further aid the removal of the finished product, a knock-out bar 11 is provided on first mould part 9. An additional knock-out bar (not illustrated) can be provided on second mould part 10, if desired.

With reference to FIG. 2, it can be seen that barrel 5 has an interior surface 52 into which are cut a number of longitudinally extending, equally spaced apart grooves 53 which prevent rotational slipping of the food mixture/formulation passing through the barrel 5. Otherwise, the feeding of the food mixture/formulation from supply hopper 2 (FIG. 1) to mould parts 9, 10 (FIG. 1) would be less efficient and blockage could arise in barrel 5.

In the conventional injection moulding of plastics, it is necessary to heat barrel 5 to melt the plastic, whereas with food mixture/formulation containing starches, heat applied at the feed end of barrel 5 will cause gelatinization of, and adherence to interior surface 52 by, the starch containing mixture/formulation this forming a food paste. Accordingly, barrel 5 is provided with a water jacket 6 of sufficient length to ensure that the paste continues to feed and barrel 5 does not clog. By contrast, nozzle 8 is heated by a heater 7 to around 80° to 120° to ensure gelatinization of the starch and to further facilitate injection of the food paste and moulding of the final food product (not illustrated).

A list of some ingredients that have been successfully incorporated into various shapes is given in Table 1 along with a typical formulation. The second table (2) indicates the quantity of individual nutrients provided by the formulation given compared with the requirements for those nutrients expressed per kilogram of bodyweight for dogs as published by the National Research Council (USA). Finally, in the third table (3) the number of bone shapes needed to be consumed by dogs of different bodyweights to meet the estimated requirements for the individual nutrients is shown.

TABLE 1

TABLE OF TYPICAL INGREDIENTS USED WITH THE AMOUNTS USED FOR ONE FORMULATION

| INGREDIENT | KG USED | KG SOLIDS | KJOULES | KG CP | KG FAT | KG C FIB | KG ASH |
|---|---|---|---|---|---|---|---|
| Dextrose | .00 | .00 | .00 | .00 | .00 | .00 | .00 |
| Fishdust | .00 | .00 | .00 | .00 | .00 | .00 | .00 |
| Gelatin | .00 | .00 | .00 | .00 | .00 | .00 | .00 |
| Glycerol | .00 | .00 | .00 | .00 | .00 | .00 | .00 |
| H$_2$O | 8.00 | .00 | .00 | .00 | .00 | .00 | .00 |
| MDM | .00 | .00 | .00 | .00 | .00 | .00 | .00 |
| Meatmeal | 44.35 | 40.98 | 789270.00 | 22.74 | 7.49 | .62 | 12.24 |
| Minerals | .00 | .00 | .00 | .00 | .00 | .00 | .00 |
| NaCl | 2.89 | 2.80 | .00 | .00 | .00 | .00 | .00 |
| Pollard | .00 | .00 | .00 | .00 | .00 | .00 | .00 |
| Rawhide | .00 | .00 | .00 | .00 | .00 | .00 | .00 |
| Sorbic Acid | .20 | .20 | 2000.00 | .00 | .00 | .00 | .00 |
| Stearate (Al) | .00 | .00 | .00 | .00 | .00 | .00 | .00 |
| Stearate (Ca) | .00 | .00 | .00 | .00 | .00 | .00 | .00 |
| Stearate (Zn) | .50 | .50 | 500.00 | .00 | .04 | .00 | .07 |
| Vit/Minerals | .50 | .50 | .00 | .00 | .00 | .00 | .00 |
| Wheatgrn | 43.56 | 38.46 | 652964.40 | 4.36 | 0.48 | 0.44 | 0.65 |
| Wheatbran | .00 | .00 | .00 | .00 | .00 | .00 | .00 |
| Wheatgerm | .00 | .00 | .00 | .00 | .00 | .00 | .00 |
| TOTALS | 100.00 | 83.44 | 1444734.40 | 27.10 | 8.01 | 1.06 | 12.97 |

| MIXTURE | % DM | KJ/100 g | % CP | % FAT | % C.FIB | % ASH |
|---|---|---|---|---|---|---|
| Mix Comp % | 100.00 | 83.44 | 1444.73 | 27.10 | 8.01 | 1.06 | 12.97 |

TABLE 2

TABLE SHOWING AMOUNTS OF NUTRIENTS PROVIDED FROM EXAMPLE FORMULATION ABOVE IN RELATION TO THE NUTRIENT REQUIREMENTS ACCORDING TO THE NRC* FOR ADULT DOG MAINTENANCE

| BONE WT (gm) = | 72.00 g PER 100 G | | | |
|---|---|---|---|---|
| ITEM | MIX | PER BONE | NRC RQTS (/KG BWT) | |
| Solids (gm) | 83.44 | 60.08 | | |
| KJ/100 gm | 1444.73 | 1040.21 | 322.91 | Kjoules |
| gm CP | 27.10 | 19.51 | 4.41 | Min |
| gm Fat | 8.01 | 5.77 | 1.32 | |
| gm NaCl | 2.98 | 2.15 | 330 | mg |
| gm Ca | 4.89 | 3.52 | .12 | |
| gm P | 1.98 | 1.43 | .10 | |
| gm Zn | .06 | .04 | .11 | |
| mg Co | .0005 | .00036 | .06 | |
| mg Fe | 18 | 13 | 1.32 | |
| mg Cu | 24 | 17 | .17 | |
| mg Mg | 153 | 110 | 11.02 | |
| mg Mn | 15 | 11 | .11 | |
| mg I | 4 | 3 | .03 | |
| iu V.A. | 1375 | 990 | 99.16 | |
| iu V.D. | 92 | 66 | 6.61 | |
| μg.B1 | 277 | 200 | 20 | |
| μg B2 | 611 | 440 | 44 | |
| μg Pyr | 305 | 220 | 22 | |
| μg P.A. | 708 | 510 | 51 | |
| μg nia | 3360 | 2420 | 242 | |
| μg F.a. | 611 | 44 | 4 | |

*National Research Council, Subcommittee on Dog Nutrition, No. 8 (1972) In Nutrient Requirements of Domestic Animals by National Academy of Sciences, Washington D.C. 20418, U.S.A.

TABLE 3

THE NUMBER OF BONES REQUIRED PER DAY TO MEET THE AVERAGE DAILY REQUIREMENT FOR DIFFERENT NUTRIENT CATEGORIES FOR DOGS IN VARIOUS WEIGHT CLASSES

| NUTRIENT | DOG WEIGHT IN KILOGRAMS | | | |
|---|---|---|---|---|
| | 10 | 20 | 30 | 40 |
| KJouls | 3 | 6 | 9 | 13 |
| gm CP | 2 | 5 | 7 | 9 |
| gm FAT | 2 | 4 | 7 | 9 |
| gm Ca | 1 | 1 | 1 | 2 |
| gm P | 1 | 1 | 2 | 3 |
| gm Zn | 1 | 2 | 3 | 4 |
| gm Al | 1 | 2 | 3 | 4 |
| gm Fe | 1 | 2 | 3 | 4 |
| gm Cu | 1 | 2 | 3 | 4 |
| gm Mg | 1 | 2 | 3 | 4 |
| gm Mn | 1 | 2 | 3 | 4 |
| gm I | 1 | 2 | 3 | 4 |
| iu V.A.(%) | 1 | 2 | 3 | 4 |
| iu V.D.(%) | 1 | 2 | 3 | 4 |
| mg.B1 | 1 | 2 | 3 | 4 |
| mg.B2 | 1 | 2 | 3 | 4 |
| mg Pyr | 1 | 2 | 3 | 4 |
| mg P.A. | 1 | 2 | 3 | 4 |
| mg nia | 1 | 2 | 3 | 4 |
| mg F.a | 1 | 2 | 3 | 4 |
| mg CHOL | 1 | 2 | 3 | 4 |
| MAX NUMBER | 3 | 6 | 9 | 13 |

What we claim is:

1. A moulding apparatus for producing a food product, the moulding apparatus comprising:
   a barrel for containing a food mixture/formulation having a heat sensitive binding agent partially activatable at a temperature of from about 70° C. to about 120° C., the barrel having an inner surface and a delivery end;
   barrel-cooler means for keeping the food mixture/formulation contained in the barrel in a preselected lower temperature range of from about 5° C. to about 60° C., whereby the heat sensitive binding agent of the food mixture/formulation in the barrel remains substantially unactivated;
   a nozzle extending from the delivery end of the barrel;
   feeding means comprising a screw operatively disposed in the barrel for feeding the food mixture/formulation from the barrel and through the nozzle under pressure and sufficient roughening on the inside of the barrel for reducing rotational slippage of the food mixture/formulation in the barrel during the feeding;
   nozzle-heater means for heating the food mixture/formulation fed through the nozzle into an upper temperature range of from about 70° C. to about 120° C., whereby to activate partially the heat sensitive binding agent of the food mixture/formulation fed from the nozzle;
   a mould communicating with the nozzle and having a mould cavity receiving the food mixture/formulation fed through the nozzle for forming the food mixture/formulation into a food product, the mould having first and second mould portions defining the mould cavity thereof movably engageable with each other to open and close the mould cavity; and
   differential mould-heater means heating the food product in the second mould portion to a temperature higher than that in the first mould portion for facilitating release of the food product from within the mould cavity defined by the mould portions when the mould portions are moved to open the mould cavity.

2. The apparatus as defined in claim 1, wherein upper temperature range is from about 80° C. to about 115° C.

3. The apparatus as defined in claim 1, wherein the upper temperature range is from about 90° C. to about 110° C.

4. The apparatus as defined in claim 1, wherein the upper temperature range is about 95° C.

5. The apparatus as defined in claim 1, wherein the upper temperature range is about 110° C.

6. The apparatus as defined in claim 1, wherein the lower temperature range is from about 15° C. to about 30° C.

7. The apparatus as defined in claim 1, wherein the lower temperature range is about 20° C.

8. The apparatus as defined in claim 1, wherein the lower temperature range is about 22° C.

* * * * *